United States Patent [19]

Floreancig

[11] Patent Number: 4,643,882
[45] Date of Patent: Feb. 17, 1987

[54] PROCESS FOR RECOVERY BY A SOLVENT OF THE URANIUM PRESENT IN PHOSPHORIC ACID

[75] Inventor: Antoine Floreancig, St. Genis Laval, France

[73] Assignee: Uranium Pechiney, France

[21] Appl. No.: 586,288

[22] Filed: Mar. 5, 1984

[30] Foreign Application Priority Data

Mar. 8, 1983 [FR] France ................................ 83 04099

[51] Int. Cl.⁴ .................... C01G 43/00; C01B 25/234; C22B 60/02
[52] U.S. Cl. .......................................... 423/8; 423/10; 423/11; 423/18; 423/319; 423/320; 423/321 S
[58] Field of Search ............. 423/10, 18, 20, 8, 321 S, 423/319, 320

[56] References Cited

U.S. PATENT DOCUMENTS

| | | | |
|---|---|---|---|
| 2,866,680 | 3/1955 | Long ........................................ | 423/7 |
| 4,190,633 | 2/1980 | Smith et al. ....................... | 423/10 X |
| 4,207,302 | 6/1980 | Smith ................................... | 423/8 X |
| 4,233,278 | 11/1980 | Korchnak ......................... | 423/10 X |
| 4,243,637 | 1/1981 | Bradford et al. ..................... | 423/10 |
| 4,250,155 | 2/1981 | Kouloheris et al. ............ | 423/321 R |
| 4,311,675 | 1/1982 | Stana et al. ........................ | 423/10 X |
| 4,311,677 | 1/1982 | Gerunda et al. ..................... | 423/18 |
| 4,431,610 | 2/1984 | Asagao et al. ..................... | 423/18 X |
| 4,490,336 | 12/1984 | Worthington et al. ................ | 423/10 |

FOREIGN PATENT DOCUMENTS

| | | | |
|---|---|---|---|
| 0016264 | 12/1979 | European Pat. Off. .............. | 423/10 |
| 0033998 | 2/1981 | European Pat. Off. .............. | 423/10 |
| 5144419 | 11/1980 | Japan ..................................... | 423/10 |

OTHER PUBLICATIONS

Chem. Abs. 78, 32163g, Feb. 1973.
Chem. Abs. 71, 31881h, Aug. 1969.
Chem. Abs. 80, 38864z, Feb. 1974.

Primary Examiner—John F. Terapane
Assistant Examiner—Virginia B. Caress
Attorney, Agent, or Firm—McDougall, Hersh & Scott

[57] ABSTRACT

A process for the recovery of the uranium present in phosphoric acid produced by a wet process in (A) by means of a suitable solvent ($L_9$), which is carried out after separation of the gypsum in (B) formed in the attack operation, and elimination of the solid materials which are still in suspension, characterized in that, in order to avoid the formation of dross in the course of the operation of extracting the uranium which is previously reduced in (D), the step of eliminating the solid materials which are still in suspension is effected by a final solid-liquid separation operation in (C) and/or in (E), prior to extraction of the uranium in (F), in the presence of an added fraction of gypsum ($S_{22}$) and/or ($S_{23}$) resulting from the production of $H_3PO_4$.

7 Claims, 1 Drawing Figure

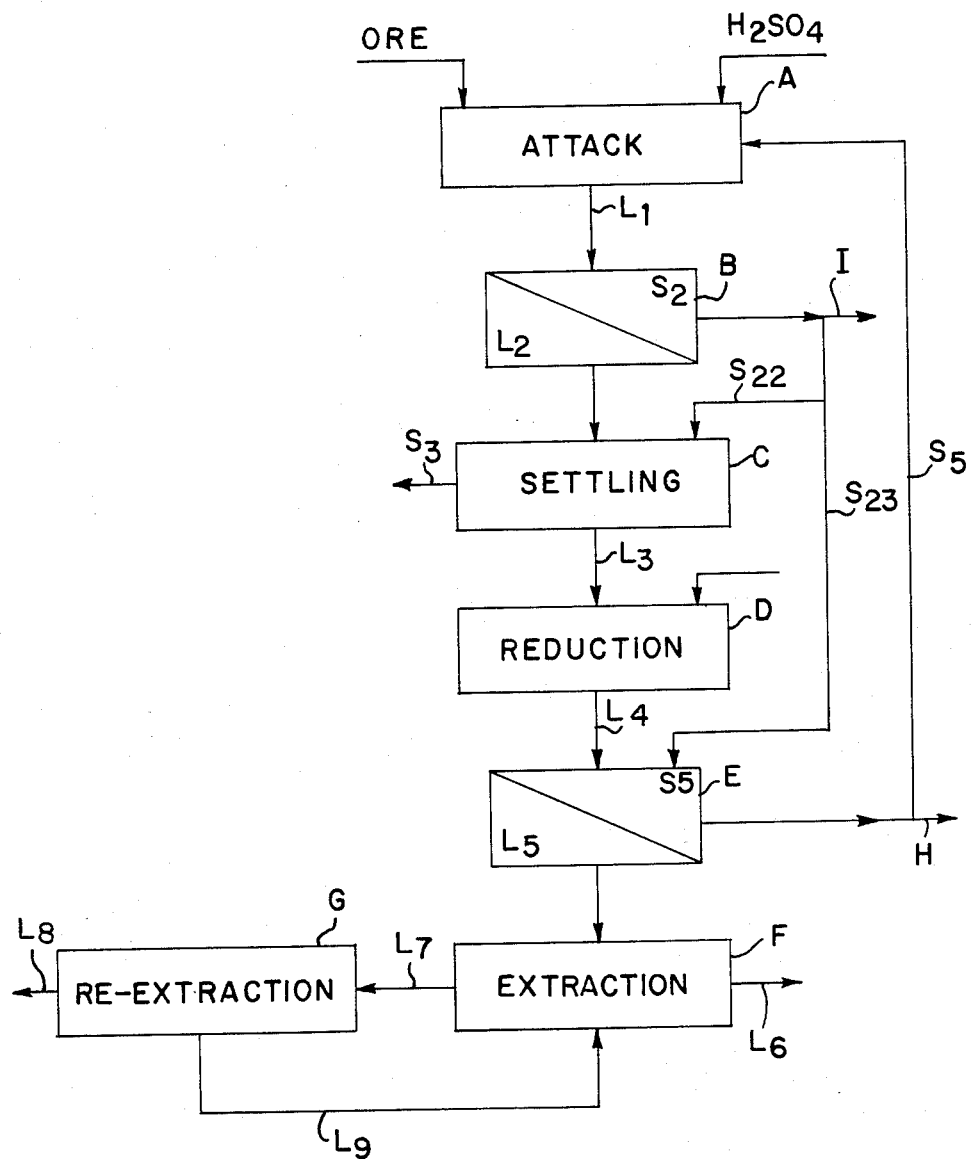
_Fig. 1_

PROCESS FOR RECOVERY BY A SOLVENT OF THE URANIUM PRESENT IN PHOSPHORIC ACID

The invention concerns a process for the recovery, by means of an organic solvent, of the uranium present in phosphoric acid which is prepared by a wet process, which comprises, before effecting the recovery operation, removing the solid matter in suspension by a solid-liquid separation operation in the presence of an added fraction of gypsum resulting from the production of $H_3PO_4$.

The recovery of uranium which is contained in wet-process phosphoric acid has already been the subject of a very great deal of research, although such acids contain little uranium, that is to say, in general, less than 200 parts per million.

In the general wet process for the production of phosphoric acid, the phosphate ore is attacked by sulphuric acid, causing phosphoric acid to be released and calcium sulphate, also referred to as gypsum, to be precipitated. Virtually all the uranium present in the phosphate ore is dissolved by the sulphuric acid and is to be found in the solution of phosphoric acid which results from the attack operation.

As is well known, the uranium contained in the phosphoric acid is extracted by means of water-immiscible solvents which have a high level of affinity for uranium, forming an uraniferous complex. Such solvents, with their high affinity for uranium, are generally dissolved in an organic carrier liquid such as substituted or unsubstituted hydrocarbons, alcohols, ketones . . . or mixtures of hydrocarbons of which kerosine is an example. The uranium is therefore transferred from the crude phosphoric acid to the organic extraction solvent.

Now, in the process for the production of $H_3PO_4$, the phosphoric acid which is produced after separation by filtration of the gypsum formed in the step of attacking the ore with sulphuric acid still contains solid matter in suspension and in variable amounts, which must be removed in order to be able to deal with the recovery of the uranium present in the phosphoric acid. For, when the removal operation is not carried out before the step of extracting the uranium, when the extraction solvent is brought into contact with the phosphoric acid to be treated, an intermediate phase appears, formed by dross, which seriously interferes with the separation of the uranium-bearing extraction solvent from the phosphoric acid from which the uranium has been removed. Therefore, the presence of the dross intermediate phase not only gives rise to the necessity to increase the surface area for separation of the phases, but also causes retention of the uranium-bearing extraction solvent, which represents an expensive waste of solvent and uranium when the volume of the dross phase is such that it becomes absolutely necessary for it to be eliminated.

The man skilled in the art has long been faced with the obligation to deal with the separation of two separate phases, solid and liquid, resulting from an industrial cycle such as for example the process in which an ore is attacked by an aqueous liquor, which results in the two phases being collected separately in order for them subsequently to be put to use by extracting therefrom the elements therein which are of interest.

Among all the separation and washing means available to the man skilled in the art such as settlers, clarifiers, cyclone separators and filters, it is well known that filtration enjoys many advantages. In fact, in the case of attack on an ore for example, the suspension resulting from the attack operation must be the subject of a process involving separation of the solid phase formed by materials which have not been attacked, and the liquid phase which contains in solution the materials which are to be put to use. In that case, filtration of the aqueous suspension resulting from the ore attack operation makes it possible to reduce the amount of liquid phase which is retained by the solid phase in the separation step and makes it possible to limit the washing volume required to entrain the liquor impregnating the solid phase. Therefore, the liquid phase produced by filtration of the attack suspension to which the volume used for washing the separated solid phase is combined constitutes an aqueous solution of very much higher concentration, giving rise to an improvement in the technology used on the downstream side of the separation step. In addition, the man skilled in the art quickly realised that filtration when carried out under industrial conditions of operation is a very easy operation to perform because it can be easily stopped, in contrast for example to using a settling vessel.

Apart from those considerations, filtration requires much lower levels of capital investment than other technologies, requires smaller occupied areas and ties up much smaller amounts of materials, etc. All those factors have particularly stimulated designers to study and produce high-capacity filtration equipment such as for example automated filter presses which have replaced the former frame-type manual apparatuses, belt-type filters and rotary or bowl-type filters.

Now, in spite of the technological improvements made in filtration equipment, in spite of using new materials such as plastics materials and synthetic fibres for filtering agents, and in spite of making use of the resources of chemistry such as improved natural flocculating agents, various synthetic polyelectrolytes, etc, it has been found in some cases that the properties of the solid phase to be filtered give rise to considerable interference with the filtration operation or even exclude that method of separation, as is the case for example with precipitated hydroxides or ores which are excessively finely crushed or ground before the attack operation. In fact, the properties of the solid phase may give rise to clogging of the cake or the filtering medium in such a way that the level of productivity drops to such an extent that it requires excessively large filtration surface areas which are too burdensome to put to use.

It is for that reason that the man skilled in the art had recourse to using auxiliary solid filtration agents which are introduced into the medium to be filtered.

French Pat. No. 1 471 332 describes for example a process for filtering sludges which are difficult to filter, originating from waste water, in which an auxiliary filtering agent such as kieselguhr or sludge ash is added to the material to be filtered.

French Pat. No. 2 086 839, which is another example, describes a filtration process which involves a separation additive formed by rigid polyurethane foams which occur in particular form.

Although the methods described in those two patents are found to be substantial improvements in the particular circumstances set forth, nonetheless disadvantages are found, which tell against the use thereof in certain circumstances, in particular when the materials forming the auxiliary filtering agent run the risk of causing pollution in regard to the medium which is subjected to the separation operation.

In the case of the wet process for producing phosphoric acid, the liquid phase which is obtained after separation of the gypsum still contains some solid material in suspension, which it is desirable to remove before the uraniferous phosphoric solution is treated with a solvent. Now, those solid materials in a state of suspension which constitute the fraction to be removed are the cause of clogging of the filtering medium and the use of auxiliary filtering agents such as diatomaceous earth, kieselguhr and the like is not found to be a favourable solution, insofar as the materials forming the auxiliary agents contain silica which reacts with the hydrofluoric acid present in the phosphoric acid, giving fluosilic acid which is a troublesome impurity in phosphoric acid.

As regards synthetic auxiliary filtering agents such as rigid polyurethane foams in a particular form, the use thereof is not desirable in major industrial processes such as the production of phosphoric acid, by virtue of the difficulties involved in using same and by virtue of their troublesome nature.

Thus, strongly aware of the major disadvantages referred to above, the applicants found and developed a process for removing the material which is still in suspension in phosphoric acid, which makes it possible to effect extraction of the uranium by means of a suitable organic agent (solvent) without the extraction operation suffering from interference due to the formation of dross.

It is for that reason that, being strongly aware of the major disadvantages referred to above, the applicants, continuing their research in this field, found and developed an improved process for the recovery by means of a solvent of the uranium present in phosphoric acid.

The process according to the invention for the recovery of the uranium present in phosphoric acid produced by a wet process, by means of a suitable solvent, which is carried out after elimination of the solid materials which are still in suspension, is characterised in that, in order to avoid the formation of dross in the course of the operation of extracting the previously reduced uranium, the step of eliminating the solid materials is carried out in a final solid-liquid separation step in the presence of an added fraction of gypsum resulting from the production of $H_3PO_4$.

As already stated hereinbefore, the uranium present in the phosphate ore is to be found in solution in the phosphoric acid resulting from the attack operation.

The applicants surprisingly found, when carrying out laboratory experiments with a view to finding a solution to the above-mentioned difficulties involved in recovery, that the formation of the dross at the moment at which the step of extracting the uranium is effected by means of an organic agent is nullified by virtue of a final solid-liquid separation operation, prior to extraction of the uranium, with respect to the solid materials which are still in a state of suspension in the phosphoric acid, by introducing into the medium gypsum which is formed in the ore attack operation. The final solid-liquid separation operation, prior to extraction of the uranium, may be performed by filtering or by settling.

When the final solid-liquid separation operation is performed by means of filtering, a fraction of gypsum from the operation of attacking the phosphate ore by means of sulphuric acid is disposed on the filtering medium constituting an intermediate cake forming a prelayer through which the uranium-bearing phosphoric acid which still contains solid materials in suspension is filtered. The pre-layer of gypsum on the filtering medium must be at least 2 millimeters and preferably between 5 and 500 millimeters in thickness.

However, it has been found to be eminently desirable for gypsum also to be introduced into the phosphoric acid to be filtered in an amount such that the solution which is formed in that way comprises at least 50 g and preferably from 100 to 5000 g of the gypsum per cubic meter of phosphoric acid to be treated.

Where the final solid-liquid separation operation is carried out by settling, a fraction of the gypsum from the phosphate ore attack operation is introduced into the uranium-bearing phosphoric acid which is maintained in an agitated state. The amount of gypsum which is introduced in that way into the phosphoric acid to be treated is generally so selected as to lie in the range of from 5 to 100 kg per cubic meter of $H_3PO_4$.

In accordance with an alternative form, the final solid-liquid separation operation which is carried out prior to extraction of the uranium may also be performed by a cascade combination of settling and filtration.

In practice, the gypsum added to the phosphoric acid, in the final solid-liquid separation prior to extraction of the uranium, is generally so added at the same time as a flocculating agent, as is conventional practice.

As soon as the final solid-liquid separation prior to extraction of the uranium contained in the phosphoric acid is concluded, the solution of phosphoric acid is treated with an agent for extracting the uranium, while the solid phase which is separated off and which is essentially formed by the added gypsum is recycled to the ore attack battery.

The uranium extracting agent is selected from the well-known group of alkyl pyrophosphoric acids in which the alkyl radical is a carbon chain corresponding to the $C_7$ to $C_{13}$ alcohols such as for example octan-2-ol, ethylhexanol and decanol. The alkylpyrophosphoric acid may be prepared in known manner by the addition of $P_2O_5$ to the above-mentioned alcohol, used alone or mixed with a hydrocarbon.

The temperature at which the operation of extracting the uranium by means of the alkylpyrophosphoric acid is performed is generally between 30° and 80° C. but preferably between 30 and 60° C.

The uranium extracting agent is generally dissolved in an aliphatic and/or aromatic hydrocarbon, for example kerosines. The mixture which is formed in that way constitutes the organic phase for extraction of the uranium, which contains from 5 to 100 g/l but preferably from 20 to 50 g/l of alkylpyrophosphoric acid.

In practice, the solutions of phosphoric acids resulting from the operation of attacking phosphate-bearing ores generally contain from 30 to 200 milligrams of uranium per liter, part of that uranium being in the form U (IV) while the other part is in the form U (VI).

The uranium (VI) is then reduced to uranium (IV) by trearing the solutions of phosphoric acids by means of iron, which occurs in the form of powder when the reduction treatment is carried out in a reaction vessel, or in the form of iron scrap when the reduction treatment is carried in a column or a rotary furnace.

After the reduction treatment has been carried out, the solutions of phosphoric acids, containing solid materials in suspension therein, are subjected to the separation operation in the presence of gypsum, before being brought into contact with the extracting agent in solution in an aliphatic and/or aromatic hydrocarbon.

The two aqueous and organic phases, to be extracted and extracting respectively, are then brought into intimate contact in the form of a fine emulsion which easily separates into a uranium-charged organic phase and an aqueous phase which is the acid from which the uranium has been removed, without dross being present. The uranium-charged organic phase is then treated with a solution for re-extraction of the uranium, such as for example an aqueous solution of hydrofluoric acid containing from 10% to 20% but preferably from 14% to 18% by weight of free HF, for the purposes of regenerating the extracting agent and recycling same.

The temperature at which the uranium re-extraction step is carried out is from 0° C. to 60° C. but preferably from 10° C. to 30° C., being a temperature at which the degree of degradation of the alkylpyrophosphoric acid remains low.

The uranium then precipitates in the form of $UF_4$ which is separated from the liquid medium by any means selected from those known to the man skilled in the art.

The alkylpyrophosphoric acid from which the uranium has been removed is then directly recycled to the step of extracting the uranium contained in the solutions of phosphoric acids, possibly after recharging with fresh alkylpyrophosphoric acid, while the solutions of phosphoric acids, from which the uranium has been removed, are themselves subjected to centrifuging in order to recovery the mechanically entrained extracting agent.

The invention will be better appreciated from the description of the accompanying drawing which is a diagrammatic view of the process according to the invention.

In the drawing, the phosphate-bearing ore in divided form and the sulphuric liquor are introduced into the reaction vessel A where the attack operation takes place.

The suspension $L_1$ resulting from the attack operation is introduced into B where the step of separating a cake $S_2$ which essentially comprises gypsum and the impregnating phosphoric liquor $L_2$ is carried out. The major part of the resulting cake $S_2$ is removed from the attack cycle at I while the other part is introduced into the region C as the fraction $S_{22}$ and into the region E as the fraction $S_{23}$.

The phosphoric liquor $L_2$ containing the uranium in solution is then introduced into the region C where settling is effected in the presence of the fraction of gypsum $S_{22}$ which was precipitated in the attack operation, thus making it possible to separate a solid fraction $S_3$ and a uranium-bearing phosphoric liquor $L_3$.

The liquor $L_3$ which contains the uranium in solution, in the forms VI and IV, is then subjected to a reduction treatment in the corresponding region D, by means of an iron compound.

After the treatment for reducing the uranium-bearing phosphoric liquor in D, the liquor $L_3$, which becomes $L_4$, is subjected to a final separation operation in E in the presence of the fraction of gypsum $S_{23}$ which is precipitated in the attack operation.

The cake $S_5$ which essentially comprises gypsum and which also contains the solid materials which are observed in suspension in the liquor $L_4$ is partially recycled to the attack operation in A while the other part is removed at H or totally recycled to the attack operation in A.

The liquor $L_5$ containing the dissolved uranium in the reduced form IV is then introduced into F where the operation of extracting the uranium is carried out by means of the recycled solvent $L_9$. In that region F, the step of separating the organic and aqueous phases is easily performed. No dross was found to be present.

On issuing from the region F, the fraction $L_6$ comprises phosphoric acid from which uranium has been removed, while the liquid fraction $L_7$ formed by the uranium-charged extracting solvent is introduced into the region G for regeneration of the uranium-extracting solvent, which is subsequently recycled to F, and recovery of a liquor $L_8$ from which the uranium can be obtained.

EXAMPLE 1

This example in intended to show the influence of an addition of gypsum, on the elimination of materials in a state of suspension in wet-process phosphoric acid.

The phosphoric acid treated in this Example was a phosphoric acid produced by the sulphuric attack on a Moroccan phosphate. After separation of the gypsum formed in the course of the attack operation, an acid was produced at the filter outlet, of the following composition:

| | |
|---|---|
| $P_2O_5$ | 28.7% |
| $SO_4$ | 4.4% |
| F | 1.5% |
| Fe | 0.12% |
| Al | 0.12% |
| Org. C | 0.05% |
| U | 125 mg/l |
| Solid materials in suspension | 19 g/l |

The solid materials had to be removed by settling before carrying out the steps of reducing and extracting the uranium by means of a solvent.

When that acid was treated as it was by means of a suitable flocculating agent such as the non-ionic flocculating agent PRAESTOL 3000 from BAYER, an acid which was black in colour and which still contained 2 g/l of material in suspension was obtained after 30 minutes of settling.

In contrast, if, before the addition of the same quantity of flocculating agent, 25 g/l of wet gypsum resulting from the separation of phosphoric acid had been added to the same acid, then, after 30 minutes of settling, the result was as acid which was green in colour and which contained only 250 mg/l of solid matter in suspension.

EXAMPLE 2

This example illustrates the recovery of uranium from phosphoric acid by means of an organic solvent after elimination of the materials in a state of suspension in a decanted phosphoric acid in which the uranium has been previously reduced from state U (VI) to state U (IV) by means of iron powder.

After the reduction operation, the treated acid contained 450 mg/l of solid materials in suspension, mainly comprising gypsum, sodium fluosilicate and carbonaceous materials introduced by the iron powder.

In accordance with the invention, the decanted and reduced phosphoric acid was filtered over a filter with a surface area of 0.08 m², in which the filter cloth was previously covered to a thickness of 6 mm with gypsum from the operation of attacking phosphate-bearing ore by means of sulphuric acid.

The phosphoric acid treated was of the following composition in percent by weight:

| | |
|---|---|
| $P_2O_5$ | 26.5% |
| $SO_4$ | 1.8% |
| F | 0.8% |
| Fe | 0.24% |
| Al | 0.13% |
| Organic C | 0.04% |
| U | 45 mg/l |
| MS | 450 mg/l |

A total of 1.1 m³ of phosphoric acid was treated in that way before reaching the pressure threshold which necessitated dismantling the filter.

The filtered acid contained less than 50 mg/l of matter in suspension.

The acid was then treated with an organic solution of 30 g/l of octylpyrophosphoric acid (OPPA) in kerosine, at respective flow rates of 100 l/h in regard to phosphoric acid and 5 l/h in regard to the organic solution. After 10 hours of operation, the two phases were still very easy to separate by virtue of the virtually complete absence of dross at the interface of the organic and aqueous phases.

Thus, in this example, there was no retention of the uranium, due to the presence of dross.

By way of comparison, the same acid as that used above was filtered over the same filter cloth which was not covered with the layer of gypsum. In that case, the filtration rate, initially 100 liters per hour, rapidly fell to below 20 liters per hour. It was possible in that way to treat only 0.1 m³ of phosphoric acid before the pressure threshold at which the filter had to be dismantled was reached. Faced with the failure, the phosphoric acid was treated directly without using the above-indicated filtration operation, using the same organic solution of OPPA in kerosine, at a flow rate of 100 l/h in respect of the phosphoric acid and 5 l/h in respect of the organic solution.

Under those conditions, an intermediate layer of dross impregnated with organic phase was gradually formed. After operation for 10 hours, the thickness of that layer was 20 mm, representing a volume of dross of the order of 1.5 liter, giving rise to a substantial loss of uranium and solvent, which could be estimated at about 3% by weight of the uranium.

Thus, the process according to the invention makes it possible to recover the uranium without causing a loss thereof, by virtue of the absence of dross.

EXAMPLE 3

This example illustrates the improvement of the filtration step by a regular addition of gypsum to the solution of $H_3PO_4$ to be filtered. For that purpose, the same phosphoric acid as that used in Example 2 was filtered, over the same filter cloth covered with a layer of gypsum to a thickness of 6 mm, but 25 g of wet gypsum was introduced into the acid to be filtered, for 100 liters of $H_3PO_4$ to be filtered.

Under those conditions, it was possible to treat 1.6 m³ of phosphoric acid before reaching the pressure threshold requiring dismantling of the filter. The filtered acid produced thus contained less than 50 mg/l of solid matter in suspension.

That acid was treated with an organic solvent under the same conditions as in Example 2, thus producing, after 10 hours of extraction, two phases which can be very easily separated because they were not polluted by dross.

I claim:

1. In a process for recovering uranium from a wet process phosphoric acid solution comprising the steps of filtering the phosphoric acid solution to remove gypsum precipitate, reducing uranium (VI) in the solution obtained from filtering to uranium (IV), and adding an organic extractant to the phosphoric acid solution containing the uranium (IV) to thereby extract the uranium (IV), the improvement comprising the addition of a filtering operation between said reduction step and said addition of the organic solvent, said filtering operation including the steps of providing a filter, covering said filter with a layer of gypsum at least 2 millimeters thick, and then filtering the solution obtained over said covered filter to remove solid materials in suspension originating from the phosphoric acid solution and the reduction step.

2. A process according to claim 1, wherein the prelayer of gypsum is from 5 to 500 millimeters in thickness.

3. A process according to claim 1, comprising the additional step of adding gypsum resulting from the wet process production of phosphoric acid to the phosphoric acid solution obtained from the reduction step, said gypsum being added at a rate of at least 50 g/m³ of acid.

4. A process according to claim 3, wherein the gypsum is added at a rate of from 100 to 5000 g/m³ of acid.

5. A process according to claim 3, wherein a flocculating agent is added to the phosphoric acid solution during the additional step.

6. A process according to claim 3, wherein the gypsum added to said phosphoric acid solution is, after filtering, recycled to the phosphate ore attack operation.

7. The process according to claim 1, wherein the gypsum covering the filter results from the wet process production of phosphoric acid.

* * * * *